July 3, 1928.
R. R. FAULCONER ET AL
1,676,013
SAW SET
Filed Nov. 22, 1926
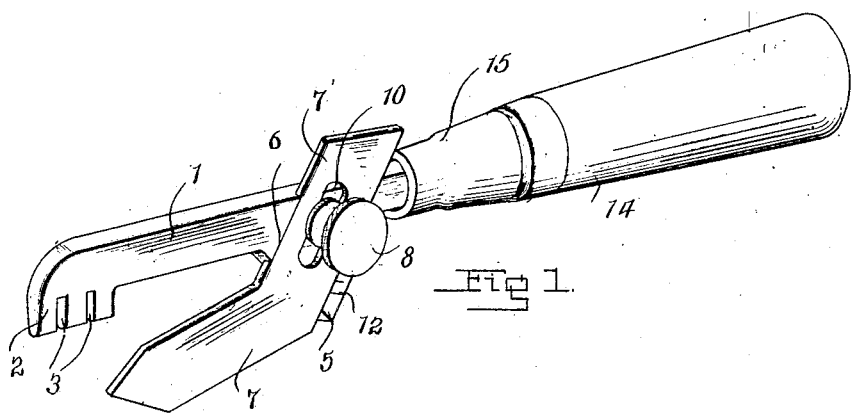
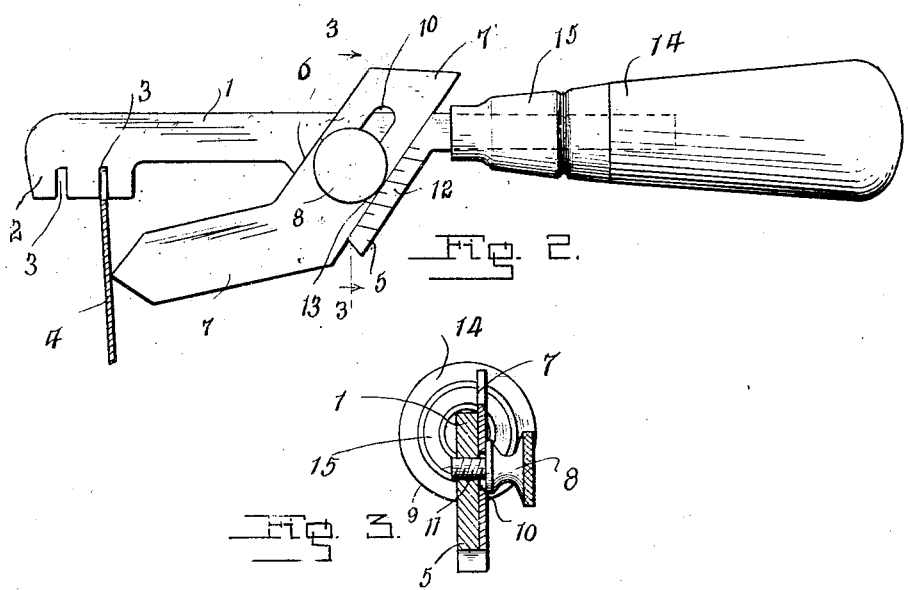
Inventor
R. R. Faulconer
W. E. Faulconer Patented July 3, 1928.

1,676,013

UNITED STATES PATENT OFFICE.

RICHARD R. FAULCONER AND WILLIAM E. FAULCONER, OF LEWISTOWN, MISSOURI.

SAW SET.

Application filed November 22, 1926. Serial No. 150,028.

This invention relates to tools and more particularly to a saw-set.

One object of the invention is to provide a saw-set so constructed that the teeth of a saw may be firmly gripped and a gage forming part of the saw-set then adjusted so that upon proper manipulation of the implement the teeth may be bent to extend at a desired incline relative to the plane in which a side face of the saw blade extends.

Another object of the invention is to so form the saw-set that it may be employed to reduce the pitch or incline of a saw tooth as well as to increase the incline.

Another object of the invention is to so mount the gage arm of the saw-set that it may be very easily adjusted and prevented from accidentally moving out of a set position when pressure is applied to bend a saw tooth.

Another object of the invention is to provide a saw-set which will be very efficient in its operation and at the same time of a simple construction and not liable to easily break or get out of order.

The invention is illustrated in the accompanying drawing, wherein

Figure 1 is a perspective view of the improved saw-set;

Fig. 2 is a view showing the saw-set in side elevation and applied to a saw blade shown in transverse section; and Fig. 3 is a transverse sectional view through the saw-set taken on the line 3—3 of Fig. 2.

The shank or bar 1 which constitutes the body portion of the saw-set is formed of steel or any other metal desired and at one end is provided with a side extension forming a head or jaw 2. Slots 3 are formed in the head or jaw 2 and are adapted to receive the teeth of the saw blade 4. In the present illustration, the head or jaw has been shown provided with two slots, one of which is intended to receive a thin saw blade and the other a thick blade, but it will be understood that additional slots of different widths may be provided if so desired or only one slot may be formed in the head. A side extension 5 which is preferably substantially triangular in shape projects transversely from the shank or body 1 in spaced relation to the head or jaw 2 and is formed with a transversely extending groove or recess 6 which is extended across the body portion 1 and is disposed diagonally of the shank, as clearly shown in Fig. 2. The groove or recess 6 constitutes a seat adapted to slidably receive the shank or rear end portion 7' of a gage arm 7. In order to retain the rear end portion of the gage arm in the seat 6 and securely but releasably hold it in a set position, there has been provided a thumbscrew 8 having a threaded stem 9 which passes through a slot 10 formed longitudinally in the rear end portion of the gage arm and is screwed into a threaded opening 11 formed in the body portion 1 intermediate the length of the seat. The thumbscrew overlaps the outer face of the gage arm at opposite sides of the slot 10 and, therefore, when the screw is tightened pressure will be applied to cause the gage arm to be firmly gripped and releasably held in a set position. Scale markings 12 are provided along the rear portion of the side extension 5 transversely of the seat 6 and a cooperating mark 13 is cut or otherwise formed in the gage arm. The scale markings 12 are preferably one-sixteenth of an inch apart, and it will be obvious that when the thumbscrew is released and the gage arm moved in the seat 6, the distance the gage arm should be moved to impart the desired pitch or set to a saw tooth may be readily determined by the scale markings and cooperating mark 13. The forward portion of the gage arm extends longitudinally of the body 1 in diverging relation thereto and terminates in a tapered end adapted to contact with the side face of a saw blade, as shown in Fig. 2. The rear portion of the body constitutes a stem for the same and is embedded in a handle 14, the forward end portion of which is reinforced by a metal ferrule 15.

When the saw-set is in use, the saw blade 4 may be secured in a vise or held under one arm and a tooth engaged in an appropriate notch 3 of the head 2. The thumb-screw 8 is loosened and the gage arm moved forwardly until its tapered end contacts with the adjacent side face of the saw blade. The thumbscrew is now tightened so that the gage arm will be held in a set position and the position of the mark 13 relative to the scale 12 carefully noted. The thumbscrew is then again released and the gage arm moved rearwardly a sixteenth of an inch or more according to the pitch it is desired to impart to the saw teeth and the thumbscrew tightened. The forward end of the gage arm will now be disposed in spaced relation to the side face of the saw blade when the saw tooth is again engaged in the notch of the head 2 and downward pressure must be applied to the handle 14 in order to bend the saw tooth a sufficient distance to again bring the gage arm into contact with the saw blade. This will cause the saw tooth to be set at the proper angle. It will, of course, be understood that the teeth having their flat faces toward the operator will be set from one side of the blade and the other teeth having their file faces toward the operator will not be set until the blade has been turned around. If the teeth of a saw have been set at too great an angle, the teeth having their filed faces toward the operator will be engaged in the notch of the head 2 and when pressure is applied to move the gage arm into engagement with the saw blade, the teeth will be bent upwardly instead of downwardly. It will thus be seen that the saw-set may be employed to reduce as well as increase the pitch of the saw teeth. It should be further noted that since the seat or recess 6 and rear end portion of the gage arm extend diagonally of the body 1 and forward portion of the gage arm, pressure applied longitudinally of the gage arm when its forward end contacts with the saw blade will be applied transversely of the seat thus preventing the gage arm from being forced longitudinally thereof out of its proper set position. Therefore, there is no danger of the gage arm being accidentally moved when the saw-set is in use and an improper angle imparted to the saw teeth.

Having thus described the invention, we claim:

1. A saw-set comprising an elongated body having a head at its forward end formed with a tooth-receiving seat, leading from its lower edge, a gage having a forward portion extending longitudinally of said body beneath the same and a rear portion extending transversely from the forward portion and upwardly and rearwardly in diagonal crossed relation to the body, and means carried by said body to engage the last-mentioned portion of said gage and releasably hold the gage in a set position with the forward end thereof in desired spaced relation to the plane of said seat.

2. A saw-set comprising a body including a portion formed with a tooth-receiving seat, a gage having a forward portion extending longitudinally beneath said body and a rear portion extending transversely from the forward portion and projecting upwardly and rearwardly in diagonal crossed relation to the body, the portion of said body crossed by said gage being formed with a seat slidably receiving the gage for movement longitudinally of its rear portion, and means to releasably secure the gage in a set position with its forward end in desired spaced relation to the plane of the tooth-receiving seat.

3. A saw-set comprising a body including a head at its forward end formed with a tooth-receiving seat, a gage having a portion extending longitudinally of said body and a portion extending transversely of the body in diagonal crossed relation thereto, the portion of said body crossed by said gage being widened and formed with a recess constituting a seat slidably receiving the gage and the said portion of the gage being formed with a longitudinally extending slot, and a set-screw pressed through said slot and having threaded engagement with said body and a portion overlapping the outer face of the gage at opposite sides of its slot whereby the set-screw when tightened may grip the gage and releasably hold the same in a set position.

In testimony whereof we affix our signatures.

RICHARD R. FAULCONER. [L. S.]
WILLIAM E. FAULCONER. [L. S.]